United States Patent [19]

Janecke et al.

[11] Patent Number: 5,325,029
[45] Date of Patent: Jun. 28, 1994

[54] METHOD OF CONTROLLING AN AUTOMATED MECHANICAL TRANSMISSION SHIFT MECHANISM

[75] Inventors: Daniel P. Janecke, Kalamazoo; Leo A. Kominek, Portage; Stephen A. Edelen, Battle Creek, all of Mich.

[73] Assignee: Eaton Corporation, Cleveland, Ohio

[21] Appl. No.: 985,190

[22] Filed: Nov. 30, 1992

[51] Int. Cl.$^5$ .............................................. B60K 17/12
[52] U.S. Cl. ................................. 318/561; 364/424.1
[58] Field of Search ..................... 318/9, 10, 560, 561, 318/599, 626, 34, 53, 264, 265, 266, 286, 466, 467, 468; 364/424.1; 74/335, 365, 866

[56] References Cited

U.S. PATENT DOCUMENTS

| | | |
|---|---|---|
| 3,105,395 | 10/1963 | Perkins . |
| 3,283,613 | 11/1966 | Perkins . |
| 4,754,665 | 7/1988 | Vandervoort . |
| 4,873,881 | 10/1989 | Edelen et al. . |
| 4,911,031 | 3/1990 | Yoshimura et al. . |
| 4,949,830 | 8/1990 | Kemner et al. . |
| 5,053,961 | 10/1991 | Genise . |
| 5,053,962 | 10/1991 | Genise . |

*Primary Examiner*—Bentsu Ro
*Attorney, Agent, or Firm*—Brooks & Kushman

[57] ABSTRACT

For use with an automated mechanical transmission system including an electrically actuated shift mechanism having a motor, a method of controlling the shift mechanism is provided for shifting the transmission out of gear during a reduced torque shift window by quickly detecting motor motion. The shift mechanism is first energized with a low effective voltage signal to minimize power consumption and avoid overheating the motor, and then with a high effective voltage signal upon detection of motor motion, to quickly shift the transmission out of gear.

9 Claims, 7 Drawing Sheets

METHOD OF CONTROLLING AN AUTOMATED MECHANICAL TRANSMISSION SHIFT MECHANISM

TECHNICAL FIELD

The present invention relates to a method of controlling a shift mechanism and, more particularly, to a method of controlling an electrically actuated shift mechanism for use on an automated mechanical transmission.

BACKGROUND ART

Transmission systems, such as those for heavy-duty trucks, which automatically shift the transmission based on throttle position, vehicle speeds, engine speeds and the like, are well known in the art. In these systems, transmission shifting can be effected in various ways. For example, the transmission system may utilize pressurized fluid to frictionally engage members to achieve a desired gear ratio. Alternatively, the system may incorporate electronic logic in conjunction with electric actuators which operate to engage and disengage mechanical clutches to achieve a desired gear ratio. These electric actuators could take the form of electric motors.

For example, United States patents relating to the automatic shifting of transmissions include U.S. Pat. No. 4,911,031, issued to Yoshimura et al., and U.S. Pat. Nos. 5,053,961 and 5,053,962, both issued to Genise and assigned to the assignee of the present invention.

In applications where a permanent magnet electric motor is utilized as a positioning device, it would be desirable to control the motor to quickly shift the transmission out of gear to the neutral position. However, the desire for this quick motion must be balanced against excessive power consumption, as well as the possibility of overheating the motor when the motor is stalled due to, for example, torque lock. Existing systems apply the same level of current to the motor during the entire preload and move to neutral motion. The speed at which the transmission can be shifted out of gear is limited by the level of current which the system can tolerate during preload.

SUMMARY OF THE INVENTION

It is an object of the present invention to provide an improved method of controlling an automated mechanical transmission shift mechanism.

It is an additional object of the present invention to provide a method for controlling an automated mechanical transmission shift mechanism to quickly shift the transmission out of gear toward the neutral position, without excessive power consumption, transmission wear or motor overheating.

In carrying out the above object and other objects and features of the present invention, there is provided, for use with an automated mechanical transmission system including at least one shift rail and an electric shifting mechanism, a method of controlling the shifting mechanism to shift the transmission out of gear during a reduced torque shift window. The shifting mechanism includes a shift finger driven by a motor, the shift finger for cooperating with the shift rail to effect shifting of the transmission. The method comprises the step of energizing the shift mechanism, while the transmission is in gear, with a low effective voltage signal having a pulse width to obtain a target motor current. The shift mechanism applies a preload force to the shift rail and the motor is unable to rotate and move the shift rail to pull the transmission out of gear due to the in-gear transmission torque. The method also comprises the steps of detecting rotation of the motor due to a reduction in the transmission torque, based on the stability of the voltage signal pulse width over a predetermined period of time, the pulse width increasing to maintain the target current as the motor rotates, and energizing the shift mechanism with a high effective voltage signal upon detecting rotation of the motor to maximize shift finger acceleration and velocity, so as to shift the transmission out of gear during a break in the transmission torque.

The advantages accruing to the present invention are numerous. For example, the method allows for quickly detecting motor motion, increasing the ability of the shift mechanism to shift the transmission out of gear and into the neutral position even during small reduced torque shift windows.

The above objects and other objects and features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
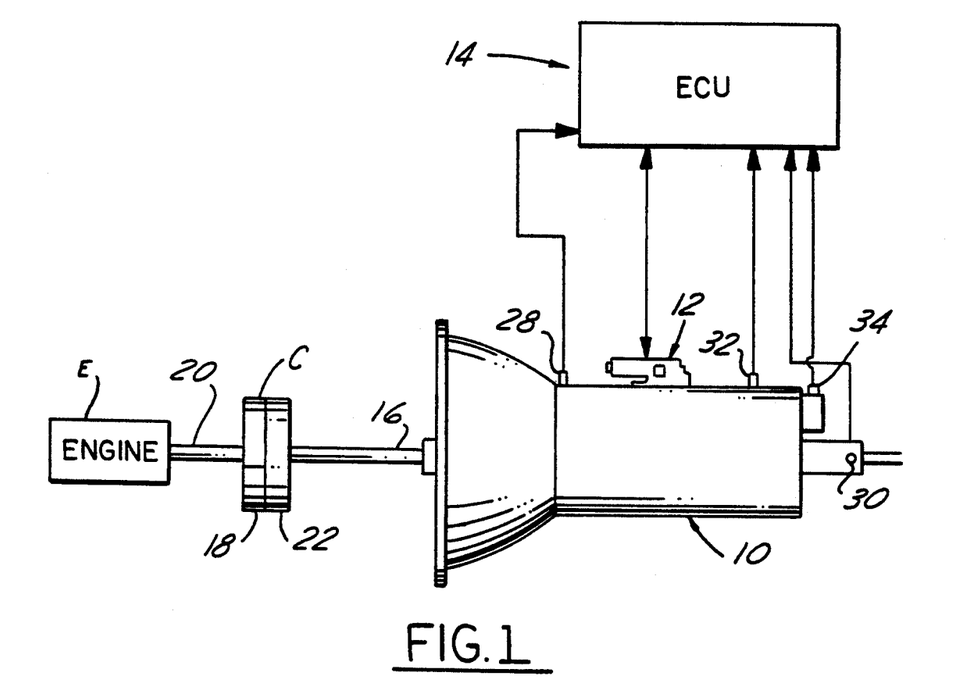
FIG. 1 is a block diagram of a transmission system, including a transmission, a shift mechanism and an electronic control unit, for use with the present invention.

Referring now to FIG. 1, there is shown a block diagram of a transmission system, including a transmission 10, an electrically actuated X-Y shift mechanism 12 and an electronic control unit (ECU) 14. The transmission 10 is a range-type compound transmission well known in the art. The compound transmission 10 includes a multiple speed main transmission section connected in series with a range type auxiliary section. The transmission 10 includes an input shaft 16 driven by a prime mover, such as an internal combustion engine E through a selectively disengaged, normally engaged friction master clutch C. The clutch has an input or driving portion 18 drivingly connected to the engine crankshaft 20, and a driven portion 22 rotatably fixed to the transmission input shaft 16. The structure and function of transmissions similar to the transmission 10 is described in greater detail in U.S. Pat. Nos. 3,105,395; 3,283,613; 4,754,665; and 5,053,962, which are assigned to the assignee of the present invention and are hereby expressly incorporated by reference in their entirety.

With continuing reference to FIG. 1, the ECU 14 includes a microprocessor (not specifically illustrated) which receives input signals from an input shaft speed sensor 28 and an output shaft speed sensor 30. The ECU 14 may also receive inputs from a mainshaft speed sensor 32 and an auxiliary section position sensor 34. The ECU 14 processes the input signals from the sensors in accordance with a predetermined strategy to control the X-Y shift mechanism 12, as described in greater detail herein below.

Figure 2:
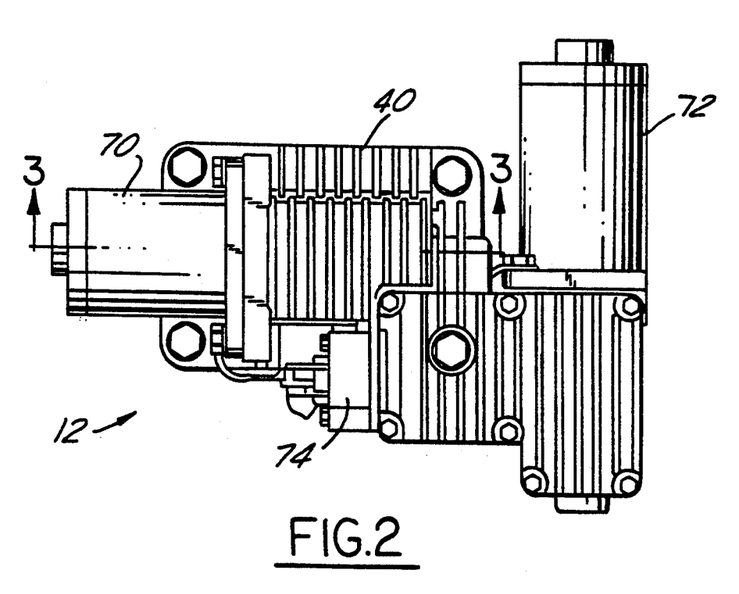
FIG. 2 is a plan view of the X-Y shift mechanism shown in FIG. 1.
Figure 3:
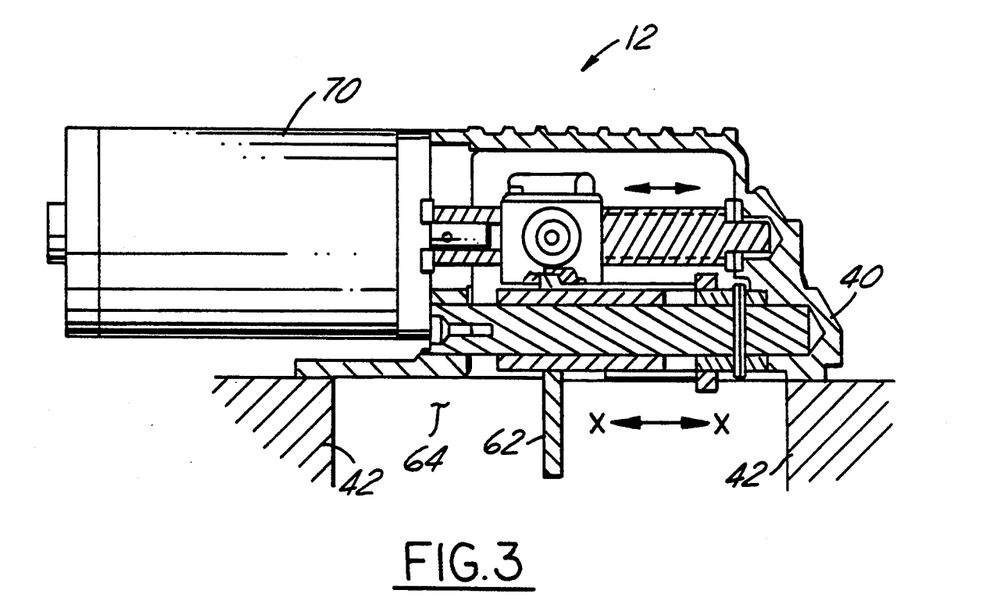
FIG. 3 is a partial cross-section of the shift mechanism taken along line 3—3 in FIG. 2.

With reference now to FIGS. 2 and 3, there is shown a top view of the electrically actuated X-Y shift mechanism 12 and a partial cross-section of the shift mechanism, respectively. As best shown in FIG. 3, the shifting mechanism 12 has a housing 40 that is mountable upon the transmission shift bar housing 42. Typically, the shift bar housing 42 encloses a plurality of substantially parallel, spaced-apart axially movable shift rails 44, 46 and 48, such as those shown known in the art and shown in FIG. 4. Each of the shift rails 44, 46 and 48 carry a shift fork 50, 52 and 54, respectively, affixed thereto for axially movement therewith. As is well known, the shift forks are each associated with a positive clutch mechanism for selectively engaging/disengaging gears to a shaft. As best shown in FIG. 3, a shift finger 62 enters the transmission through opening 64 in the housing 42 to selectively engage the shift rails of the transmission.

Figure 4:
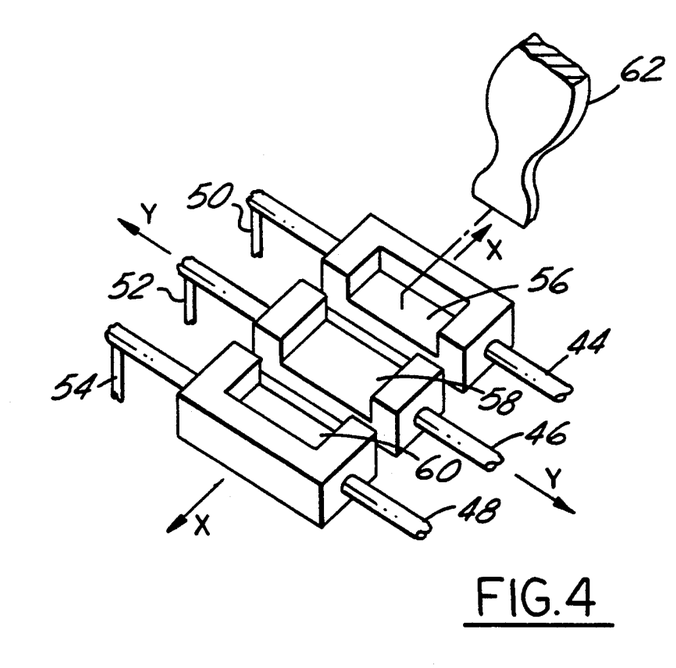
FIG. 4 is a perspective view of shift rails commonly used in mechanical gear change transmissions.

With continuing reference to FIGS. 2, 3 and 4, shifting of the transmission 10 is typically accomplished by selecting a shift rail 44, 46 or 48 by moving the shift finger 62 axially along the X—X axis into alignment with a shift block 56, 58 or 60 carried by the selected shift rail 44, 46 or 48, respectively. Next, axial movement of the selected shift rail is effected by axially moving the shift finger 62 to apply an axial force in the direction of Y—Y axis. The motors 70 and 72 are controlled by the ECU 14 (shown in FIG. 1) to automatically move the shift finger 62 as described above. Sensor means such as a rotary potentiometer 74, best shown in FIG. 2, provides a signal to the ECU 14 indicative of the position of the shift finger 62.

As best shown in FIGS. 2 and 3, the shift mechanism 12 includes a first electrical motor 70 mountable thereon that is operable to move the shift finger 62 in a first axial direction and a second electrical motor 72 mountable thereon that is operable to move the shift finger 62 in a second axial direction. Motors 70 and 72 are powered by a suitable power source, such as the vehicle battery. The control signals generated by the ECU 14 energize the motor 70 to move the shift finger 62 in a first axial direction (i.e. X—X) into registration with the particular shift rail selected. The control signals then energize the motor 72 to cause the shift finger 62 to move the selected shift rail in a second axial direction (i.e. Y—Y) to effect the particular gear engagement or disengagement desired. The structure and function of the shift mechanism 12 is described in greater detail in U.S. Pat. No. 4,873,881, which is assigned to the assignee of the present invention and hereby expressly incorporated by reference in its entirety.

Figure 5:
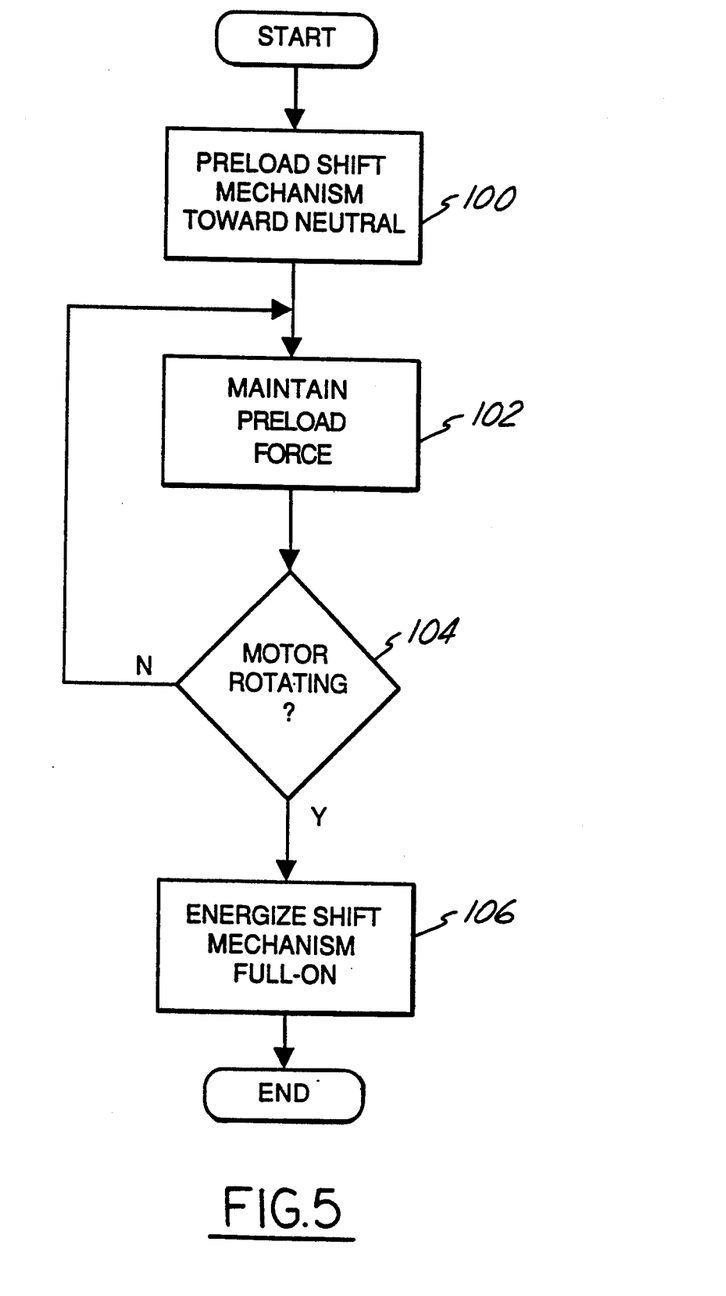
FIG. 5 is a flow chart detailing the steps of the present invention for controlling the shift mechanism shown in FIGS. 2 and 3.

Referring now to FIG. 5, there is shown a flow chart detailing the steps of the method of controlling an automated mechanical transmission shift mechanism of the present invention. Generally, the method of the present invention successfully balances the desire for quickly shifting the transmission out of gear to the Neutral position during a zero-torque window, without excessive power consumption and without the possibility of overheating the shift mechanism motors. The key to providing this quick shift out of gear to neutral is the ability to quickly detect motor motion. In the first preferred embodiment, motor motion is detected utilizing the shift finger position signal output from the potentiometer 74 of the shift mechanism 12, as described in greater detail hereinbelow.

Figure 6:
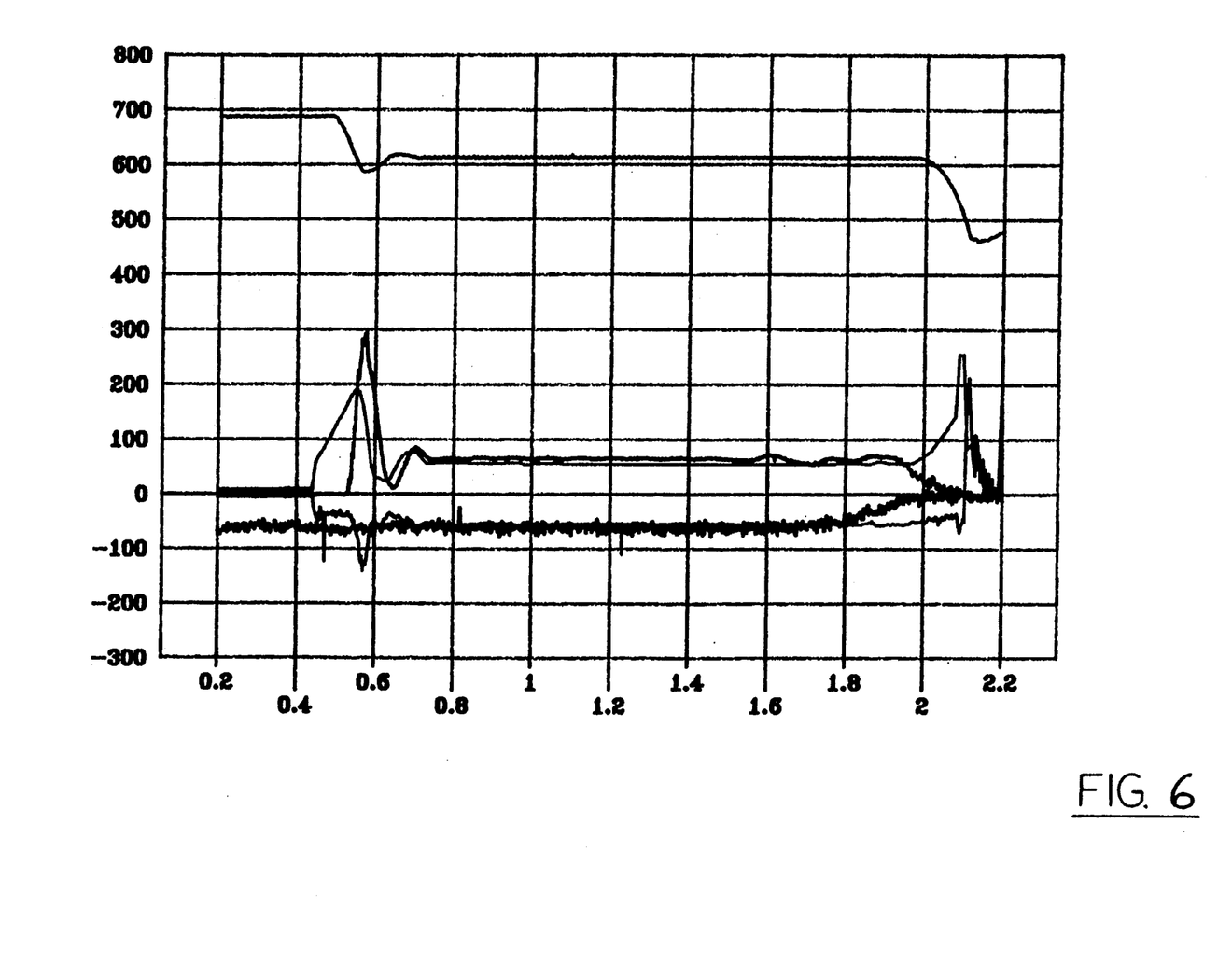
FIG. 6 is a graphical illustration of traces indicating shift finger position, shift finger force, motor voltage pulse width, driveline torque and motor torque, as measured over time during shifting of the transmission out of gear and into the Neutral position, according to one embodiment of the present invention.
Figure 7:
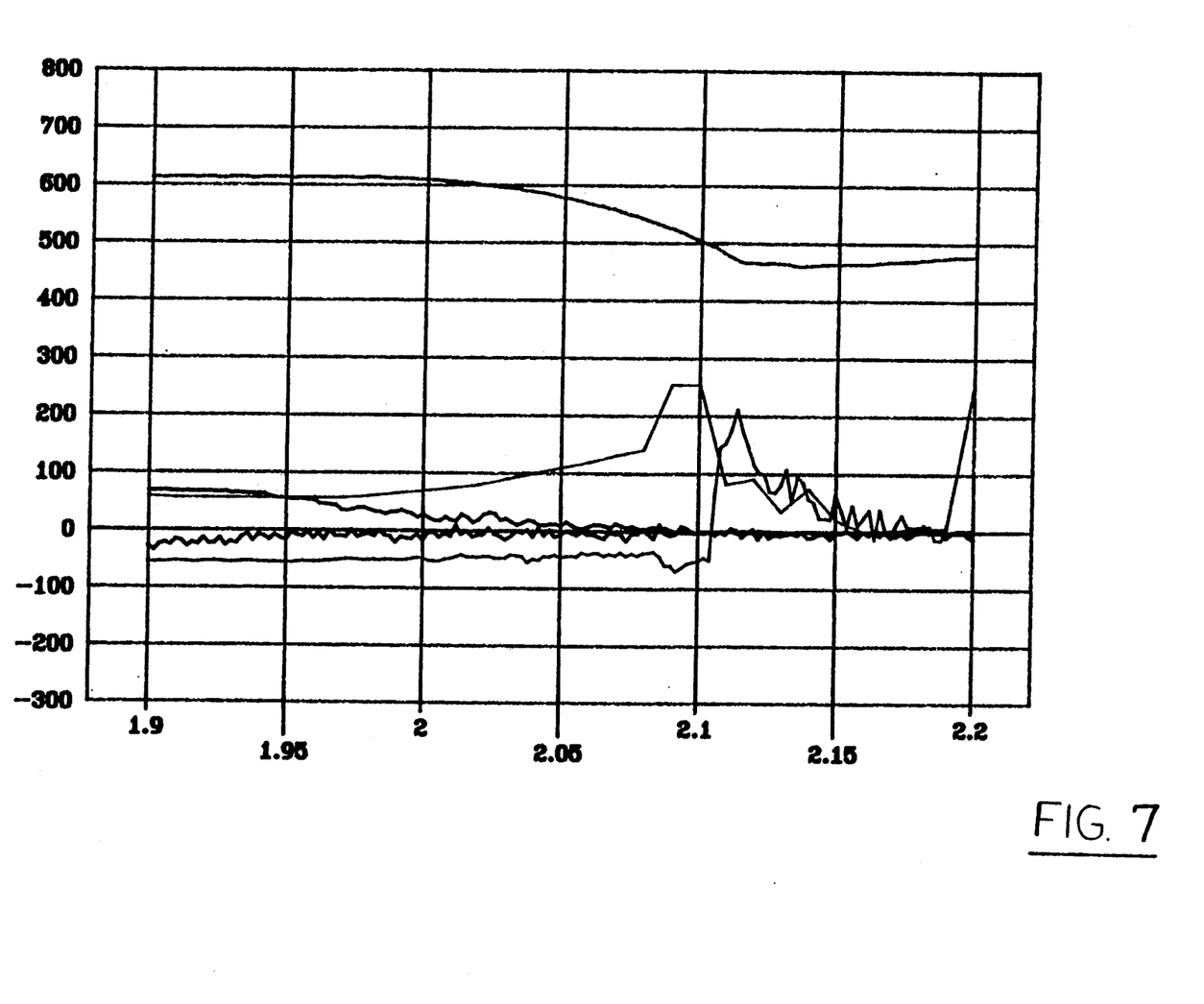
FIG. 7 is an enlarged view of a portion of the FIG. 6, from about time t=1.9 to about time t=2.2, illustrating the detection of shift mechanism motor motion based on the shift finger position signal according to the present invention.

FIG. 6 is a graphical illustration of traces illustrating the shift finger position, shift finger force, motor voltage PWM, motor current and driveline torque, as the shift mechanism 12 is controlled according to the flow chart of FIG. 5, based on position information from the shift mechanism potentiometer 74. FIG. 7 is an enlarged view of a portion of FIG. 6, illustrating in greater detail the detection of motor motion based on shift finger position.

With combined reference now to FIGS. 5 and 6, when a transmission shift is commanded by the ECU 14, the shift mechanism 12 is energized at step 100 and the shift finger 62 is "preloaded" toward the Neutral position. During this preload period, the motor 72 is energized with a low effective voltage output from the ECU 14 to obtain a predetermined target level of electric current to maintain a low level of shift finger force (e.g. 50 lbs.). The target current is maintained by the ECU 14, which utilizes the actual motor current as feedback. Energization of the motor 72 causes the shift finger 62 to move in the gear select direction (i.e. Y—Y direction). The preload shift force generated by the motor 72 is unable to shift the transmission to the Neutral position, due to transmission torque lock. As a result, shift finger movement is generally limited to movement within a shift block, such as shift block 58. Maintaining a low effective voltage at the motor 72 when the shift finger motion is stopped by torque lock helps to reduce transmission component wear and power consumption, and to prevent the motor and associated ECU drive circuitry from overheating.

The limited movement of the shift finger is illustrated with reference to the various traces of FIG. 6. At about point A, the shift finger position signal indicates that the motor 72 has been energized and the shift finger is moving within the shift block 58. Movement of the shift finger continues until the shift finger impacts a shift block wall (see about point B), at which time shift finger forces, as measured by a strain gauge affixed thereto, reach a maximum (see about point C) and the motor current peaks (see about point D).

During this period, the ECU 14 first increases the pulse width of the voltage signal (see about point E) and then decreases the pulse width (see about point F) in attempt to maintain the preload target motor current during movement of the shift finger. As shown in FIG. 6, by time t=0.8, the shift finger 62 has settled into the preload position, resting against and applying a stabilized preload force to the shift block. At this time, the target motor current is attained, and the voltage pulse width has stabilized. As the traces of FIG. 6 illustrate, at step 102 of FIG. 5 the preload force is maintained until the driveline torque is reduced, as described in greater detail below.

Referring now to FIG. 7, there is shown an enlarged portion of FIG. 6, from about time t=1.9 to about time t=2.2, illustrating the detection of motor motion based on the shift finger position. It is desirable to detect motor motion quickly, so that the motor 72 can be controlled to quickly shift the transmission to the Neutral position during the shift window created by a drop in the driveline torque. As driveline torque is reduced to about 0 lb-ft (see about point G), the shift finger 62 starts to move, since the preload force of the shift finger becomes large enough to start pulling the transmission out of gear. Accordingly, as the motor 72 just starts to rotate, the shift finger force decreases (see about point H) and the voltage pulse width increases (see about point I), as the ECU 14 attempts to maintain the target current and, therefore, the preload force. The shift mechanism continues to move the shift rail 46 toward the Neutral position, as indicated by the shift finger position trace (see about point J).

In this preferred embodiment, the shift finger position signal from the potentiometer 74 (best shown in FIG. 2) is an analog voltage signal, having a range of 0V to about 5V. This analog signal is monitored by a microprocessor of the ECU 14, and converted to a corresponding digital signal, having a corresponding range of about 0 to 1023. At step 104, the ECU 14 determines whether the motor is rotating, based on the shift finger position signal. Preferably, the microprocessor detects motor motion by detecting changes in the shift finger position signal utilizing a slope averaging technique, wherein the average of the past four (4) shift finger position values is compared to the present value of the shift finger position signal during each loop (about 2 mS). Most preferably, if the difference between the compared values exceeds 2 bits, the ECU 14 considers the motor to be in motion, i.e. rotating.

With continuing reference to FIG. 7, when the microprocessor has determined that the motor 72 is rotating, based on the slope averaging of the shift finger position signal value, at step 106 the motor 72 is energized with a full-on voltage pulse width (see about point K), and the motor current accordingly rises (see about point L). By energizing the motor 72 with a high effective voltage, motor acceleration and speed is maximized, resulting in the transmission being shifted to the Neutral position quickly during a zero-torque shift window. In additional to preventing overheating, reducing power consumption and transmission wear, this methodology ensures that the transmission will not be stuck in gear due to reversed torque. With motor motion beginning at about time t=1.98, and the Neutral position being achieved at about time t=2.13, it thus takes about 0.15 seconds to complete the shift from the time motor motion begins.

In an alternative embodiment, the shift mechanism is controlled according to the flowchart of FIG. 5, but motor motion is detected utilizing the voltage pulse width signal, instead of the shift finger position signal. By monitoring for an increase in the pulse width of the voltage signal, motor motion is detected quicker than monitoring the shift finger position signal. As a result, this methodology results in quicker shifts to the Neutral position, increasing the likelihood for shifting the transmission to the Neutral window even during small zero-torque windows.

Figure 8:
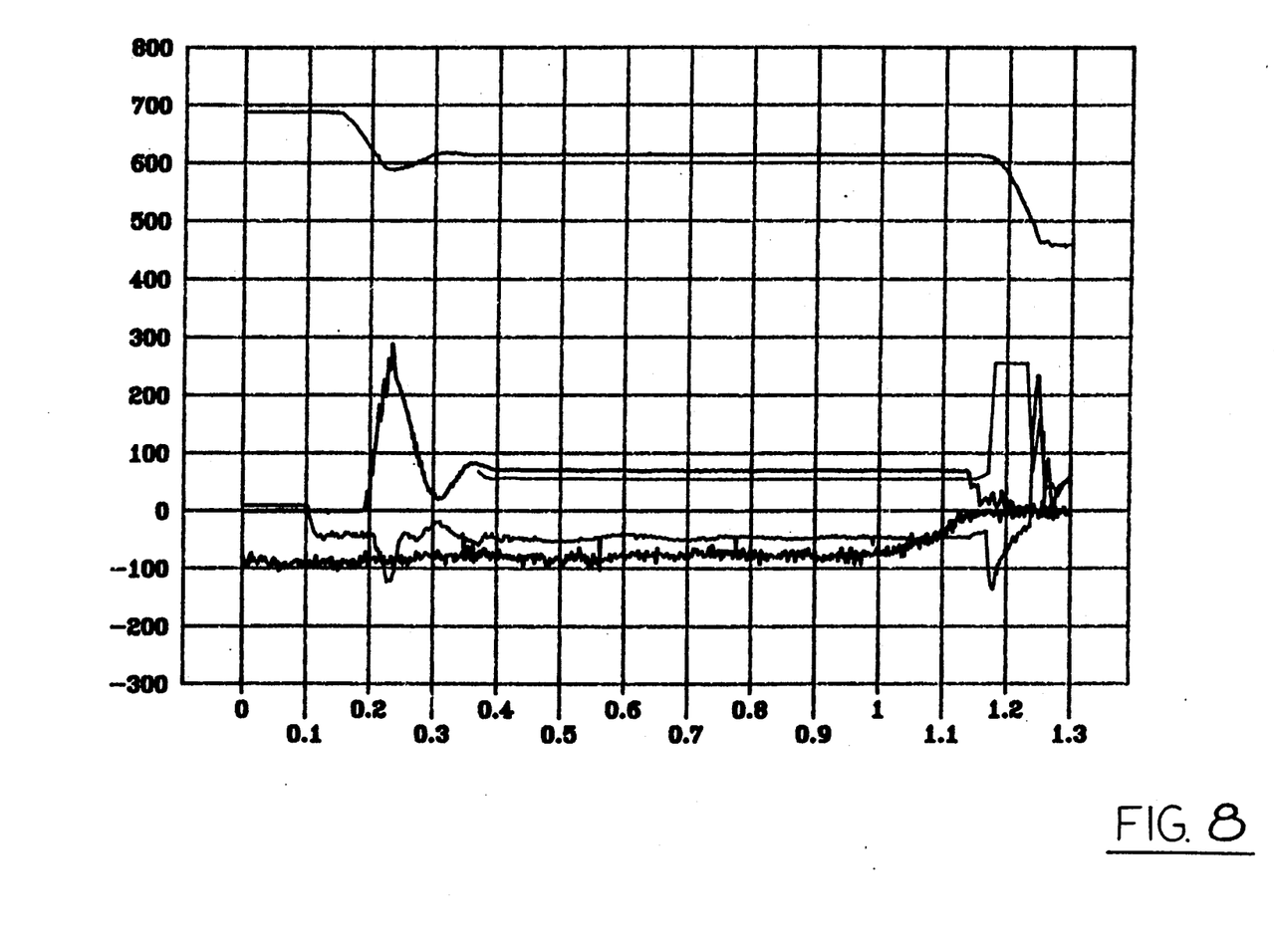
FIG. 8 is a graphical illustration of traces indicating shift finger position, shift finger force, motor voltage pulse width, driveline torque and motor torque, as measured over time during shifting of the transmission out of gear and into the Neutral position, according to an alternative embodiment of the present invention.
Figure 9:
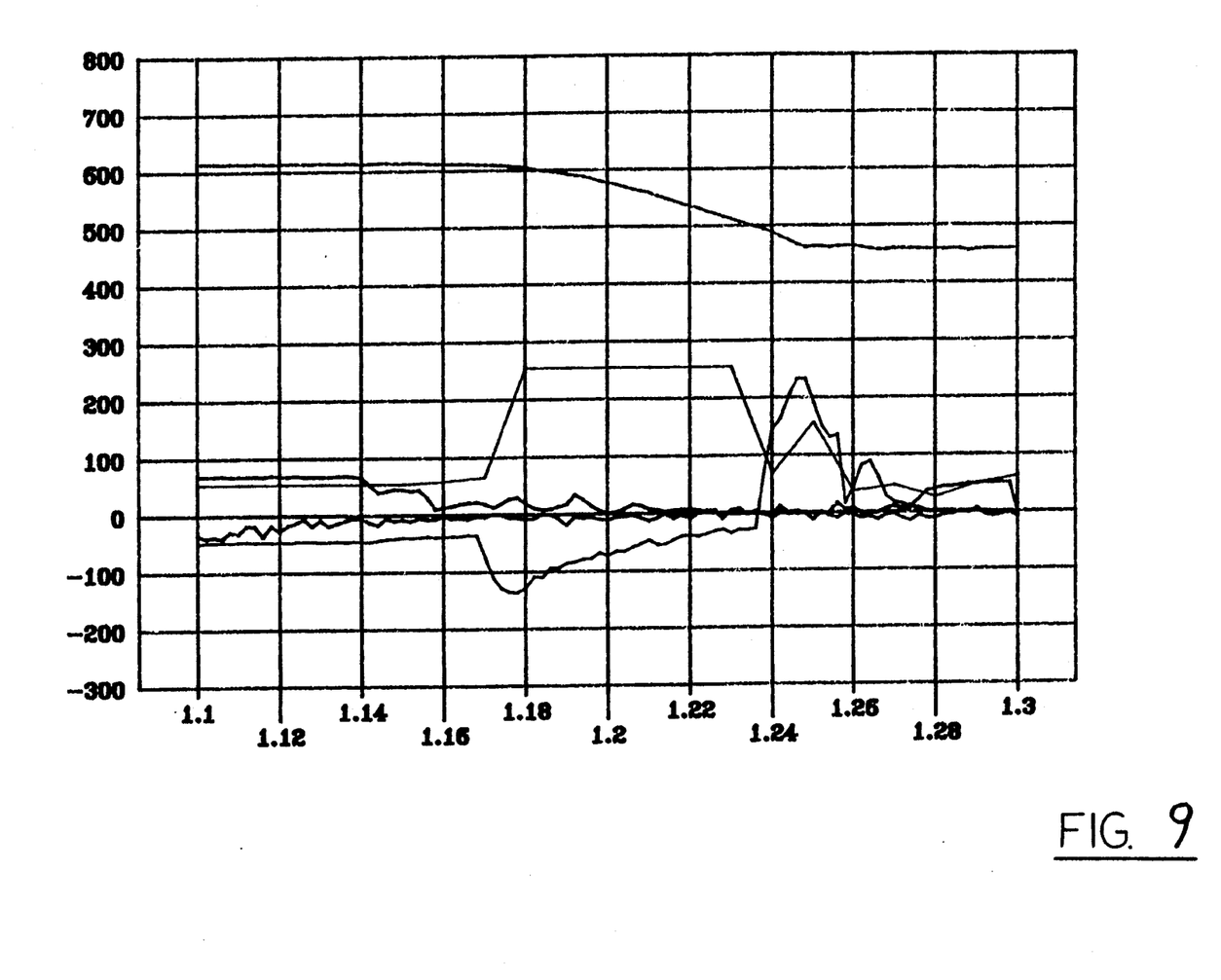
FIG. 9 is an enlarged view of a portion of the FIG. 8, from about time t=1.1 to about time t=1.3, illustrating the detection of shift mechanism motor motion based on the voltage pulse width according to the present invention.

Referring now to FIG. 8, there is shown a graphical illustration of traces illustrating the shift finger position, shift finger force, motor voltage PWM, motor current and driveline torque, as the shift mechanism 12 is controlled according to the flow chart of FIG. 5, based on the motor voltage pulse width. FIG. 9 is an enlarged view of a portion of FIG. 8, illustrating in greater detail the detection of motor motion based on the motor voltage pulse width.

With combined reference now to FIGS. 5 and 8, when a transmission shift is commanded by the ECU 14, at step 100 the shift mechanism is energized and the shift finger 62 is preloaded toward the Neutral position. As in the previous embodiment, during this preload period, the motor 72 is energized with a low effective voltage and controlled to maintain a predetermined target level of motor current to produce a low level of shift finger force (e.g. 50 lbs.), utilizing the actual motor current as feedback.

As best shown in FIG. 8, the movement of the shift finger associated with preloading is illustrated with reference to the various traces. At about point A', the shift finger position signal indicates that the motor 72 has been energized and the shift finger is moving within the shift block. Movement of the shift finger continues until the shift finger impacts a shift block wall (see about point B'), and further travel is prevented due to driveline torque lock. As the shift finger initially continues to try to shift the transmission to Neutral, the shift finger force, measured by a strain gauge affixed thereto, reaches a maximum (see about point C') and the motor current peaks (see about point D').

During this period, the ECU 14 attempts to maintain the preload target current, first increasing the pulse width of the voltage signal (see point E') and then decreasing the pulse width (see point F'). By time t=0.8, the shift finger 62 has settled into the preload position, resting against and applying a stabilized preload force to the shift notch. At this time, the target current is attained, and the voltage pulse width is stabilized. As the traces of FIG. 8 illustrate, at step 102 the preload force is maintained until the motor motion is detected (i.e. when the driveline torque is reduced), as described in greater detail below. Maintaining a low effective voltage at the motor 72 when motor rotation is prevented by torque lock helps to reduce transmission component wear and power consumption, and to prevent the motor and associated ECU drive circuitry from overheating.

With additional reference to FIG. 9, there is shown an enlarged portion of FIG. 8, from about time t=1.1 to about time t=1.3, illustrating the detection of motor motion based on an increase in the pulse width of the motor voltage signal. It is desirable to detect motor motion as quickly as possible, so that the motor 72 can be controlled to quickly shift the transmission to the Neutral position during the shift window created by a drop in the driveline torque. As driveline torque is reduced to about 0 lb-ft (at about time t=1.16), the shift finger 62 starts to move slightly, since the preload force of the shift finger becomes large enough to start pulling the transmission out of gear toward the Neutral position. Accordingly, as the motor 72 has just started to rotate, the shift finger force decreases (see about point H') and the voltage pulse width starts to increase (see about point (I'), as the ECU 14 attempts to maintain the target motor current. The shift mechanism continues to move the shift rail toward the Neutral position, as indicated by the shift finger position trace (see about point J').

In this preferred embodiment, at step 104 of FIG. 5 the ECU 14 determines whether the motor is rotating, based on the pulse width of the voltage signal. If the motor is rotating, the level of pulse width modulation required to maintain the target current will vary generally proportionally to the angular velocity of the motor. If motor motion is prevented (such as during torque lock) the pulse width is stabilized and maintained until the motor begins to rotate, provided that a relatively constant supply voltage is maintained and that motor temperature rise over the relevant time period is insignificant. Thus, monitoring for an increase in the pulse width produces a trigger for detecting motor motion which is more sensitive than utilizing the shift finger position signal.

Most preferably, the microprocessor detects motor motion at step 104 by detecting changes in the voltage pulse width signal, utilizing a baseline pulse width and an offset pulse width. The offset pulse width has a predetermined value (e.g. about 2½), whereas the baseline pulse width is preferably established utilizing a slope averaging technique. For slope averaging, the average of the past four (4) voltage pulse widths is compared to the present value of the voltage pulse width during each loop (about every 2 mS). If the difference between the present value and the averaged values is less than or equal to about ½%, the pulse width is considered to be stable and the motor is not considered to be rotating. If the pulse width is deemed stable for a predetermined amount of time (e.g. about 50 mS), the present stable pulse width value becomes the baseline pulse width. Then, if the present voltage pulse width exceeds the sum of the baseline and offset pulse widths, then the ECU 14 considers the motor to be in motion, i.e. rotating.

With continuing reference to FIG. 9, when the microprocessor has determined that the motor 72 is rotating, based on the voltage pulse width, at step 106 the microprocessor energizes the motor 72 with a full-on voltage pulse width (see about point K'), and the motor current accordingly rises (see about point L'). Utilizing this methodology for detecting motor motion, the shift mechanism can be fully energized much sooner after a zero-torque condition exists, preventing the transmission from being trapped in gear due to reverse torque and increasing the chances for pulling the transmission out of gear even during small zero-torque windows. With motor motion beginning at about time t=1.16, and the Neutral position being achieved at about time t=1.26, it thus takes about 0.10 seconds to complete the shift from the time motor motion begins. Of course, these figures are for illustrative purposes only. However, the time required to shift the transmission to the Neutral position is significantly less by detecting motor motion based on voltage pulse width. It should be appreciated by one of ordinary skill in the art that this methodology provides distinct advantages by reducing the need for sensors to detect motor motion and by reducing the time required to detect motion.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. For use with an automated mechanical transmission system including at least one shift rail and an electric shifting mechanism, the shifting mechanism including a shift finger driven by a motor, the shift finger for cooperating with the shift rail to effect shifting of the transmission, a method of controlling the shifting mechanism, the method comprising:

energizing the shift mechanism, while the transmission is in gear, with a low effective voltage signal having a pulse width to obtain a target motor current, the shift mechanism applying a preload force to the shift rail, the motor being unable to rotate and move the shift rail to pull the transmission out of gear due to the in-gear transmission torque; and detecting rotation of the motor due to a reduction in the transmission torque, based on the stability of the voltage signal pulse width over a predetermined period of time, the pulse width increasing to maintain the target current as the motor rotates, for the purpose of shifting the transmission out of gear during a break in the transmission torque.

2. The method of claim 1 further comprising energizing the shift mechanism with a high effective voltage signal upon detecting rotation of the motor to maximize shift finger acceleration and velocity, so as to shift the transmission out of gear during a break in the transmission torque.

3. The method of claim 2 wherein rotation of the motor is detected by comparing the present pulse width to the sum of a baseline pulse width and an offset pulse width, the offset pulse width having a predetermined value and the baseline pulse width representing a stable pulse width value associated with substantially no motor rotation.

4. The method of claim 3 wherein the baseline pulse width is obtained by slope averaging a predetermined number of previous voltage signal pulse widths.

5. For use with an automated mechanical transmission system including at least one shift rail and an electric shifting mechanism, the shifting mechanism including a shift finger driven by a motor, the shift finger for cooperating with the shift rail to effect shifting of the transmission, a method of controlling the shifting mechanism to shift the transmission out of gear during a reduced torque shift window, the method comprising the steps of:

sensing the position of the shift finger to obtain a position signal;

energizing the shift mechanism with a low effective voltage signal such that the shift finger applies a preload force to the shift rail, the motor being unable to rotate and move the shift rail to pull the transmission out of gear due to the transmission torque;

monitoring the shift finger position signal to detect rotation of the motor due to a reduction in the transmission torque which allows the preload force to move the shift rail; and energizing the shift mechanism with a high effective voltage signal upon detecting rotation of the motor to maximize shift finger acceleration and velocity, so as to shift the transmission out of gear during a break in the transmission torque.

6. The method of claim 5 wherein the step of monitoring includes comparing the present shift finger position to a baseline shift finger position, the baseline shift finger position obtained by slope averaging a predetermined number of previous shift finger positions.

7. For use with an automated transmission system including at least one and an electric shifting mechanism for controlling the shifting of the transmission, the shifting mechanism including a shift finger driven by a motor, the shift finger cooperating with the shift rail to effect shifting of the transmission, a method of controlling the shifting mechanism for shifting the transmission out of gear, the method comprising the steps of:

energizing the motor with a low effective voltage signal having a first pulse-width while the transmission in gear, so as to provide a preload force on the shift rail toward the neutral position, the transmission torque preventing the motor from rotating;

reducing the transmission torque so as to create a shift window during which the preload force on the shift rail is sufficient to initiate movement of the shift rail toward the neutral position, the motor rotating upon the initiation of shift rail movement;

detecting rotation of the motor based on the stability of the voltage signal pulse width over a predetermined period of time, the pulse width increasing as the motor rotates; and energizing the motor with a high effective voltage signal having a second pulse width upon rotation of the motor, so as to maximize shift finger acceleration and velocity, thereby ensuring shifting of the transmission out of gear during the shift window.

8. The method of claim 7 wherein the step of detecting rotation of the motor includes comparing the present voltage signal pulse width to the sum of a baseline pulse width and an offset pulse width, the offset pulse width having a predetermined value and the baseline pulse width representing a stable pulse width value associated with substantially no motor rotation.

9. The method of claim 8 wherein the baseline pulse width is obtained by slope averaging a predetermined number of previous voltage signal pulse widths.

* * * * *

UNITED STATES PATENT AND TRADEMARK OFFICE
CERTIFICATE OF CORRECTION

PATENT NO. : 5,325,029
DATED : June 28, 1994
INVENTOR(S) : JANECKE ET AL.

It is certified that error appears in the above-identified patent and that said Letters Patent is hereby corrected as shown below:

Column 7, Line 5
delete "(I')" and substitute therefor --I')--.

Column 7, Line 29
delete "2½" and substitute therefor
--2½%--.

Column 8, Line 32                                    delete
"i" and substitute therefor --1--.

Column 9, Line 13
    after "one" insert --shift rail--.

Column 9, line 12, after "automated" insert --mechanical--.

Signed and Sealed this

Seventeenth Day of January, 1995

Attest:

BRUCE LEHMAN

*Attesting Officer*      *Commissioner of Patents and Trademarks*